(12) United States Patent
Cheng et al.

(10) Patent No.: US 11,921,189 B2
(45) Date of Patent: Mar. 5, 2024

(54) RADAR SYSTEMS AND METHODS USING THE SAME

(71) Applicant: ZHEJIANG DAHUA TECHNOLOGY CO., LTD., Zhejiang (CN)

(72) Inventors: Miao Cheng, Hangzhou (CN); Zhiji Deng, Hangzhou (CN); Ming Liu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/648,296

(22) Filed: Jan. 18, 2022

(65) Prior Publication Data

US 2022/0137205 A1 May 5, 2022

Related U.S. Application Data

(63) Continuation of application No. PCT/CN2020/101329, filed on Jul. 10, 2020.

(30) Foreign Application Priority Data

Jul. 25, 2019 (CN) .......................... 201910676785.7

(51) Int. Cl.
*G01S 13/72* (2006.01)
*G01S 13/88* (2006.01)

(52) U.S. Cl.
CPC .......... *G01S 13/723* (2013.01); *G01S 13/886* (2013.01)

(58) Field of Classification Search
None
See application file for complete search history.

(56) References Cited

U.S. PATENT DOCUMENTS

| 4,321,601 A | 3/1982 | Richman |
| 4,961,075 A | 10/1990 | Ward |

(Continued)

FOREIGN PATENT DOCUMENTS

| CN | 102508238 | 6/2012 |
| CN | 104821056 | 8/2015 |

(Continued)

OTHER PUBLICATIONS

International Search Report in PCT/CN2020/101329 dated Sep. 28, 2020, 4 pages.

(Continued)

*Primary Examiner* — Whitney Moore
(74) *Attorney, Agent, or Firm* — METIS IP LLC

(57) ABSTRACT

System and method for determining a 3D coordinate of a moving target are provided. The system may obtain 2D detection data of the moving target generated by a 2D detection device including two detection assemblies that are mounted at a known height above a horizontal plane along a first axis that forms a tilting angle with the horizontal plane. The system may determine a 2D coordinate of the moving target in a first coordinate system including the first axis and a second axis that is perpendicular to the first axis based on the 2D detection data. The 2D coordinate of the moving target may include a first value of the first axis and a second value of the second axis. The system may determine the 3D coordinate of the moving target in a second coordinate system based on the 2D coordinate, the tilting angle, and the known height.

20 Claims, 12 Drawing Sheets

(56) References Cited

U.S. PATENT DOCUMENTS

| | | | |
|---|---|---|---|
| 6,466,157 | B1 | 10/2002 | Bjornholt et al. |
| 6,950,021 | B2 | 9/2005 | Butler |
| 10,062,255 | B1 * | 8/2018 | Russell ................. G01S 13/867 |
| 2004/0233098 | A1 | 11/2004 | Millikin et al. |
| 2016/0025849 | A1 | 1/2016 | Wang et al. |
| 2022/0406151 | A1 * | 12/2022 | Kaindl .................. G01S 13/886 |

FOREIGN PATENT DOCUMENTS

| | | |
|---|---|---|
| CN | 105389920 | 3/2016 |
| CN | 106932784 | 7/2017 |
| CN | 108398672 | 8/2018 |
| CN | 109239706 | 1/2019 |
| CN | 109655798 | 4/2019 |
| JP | 2001201563 | 7/2001 |
| WO | 2008010269 | 1/2008 |
| WO | 2021012970 | 1/2021 |

OTHER PUBLICATIONS

Written Opinion in PCT/CN2020/101329 dated Sep. 28, 2020, 5 pages.
First Office Action in Chinese Application No. 201910676785.7 dated Feb. 25, 2021, 9 pages.
The Extended European Search Report in European Application No. 20843717.8 dated Jul. 12, 2022, 8 pages.

* cited by examiner

RADAR SYSTEMS AND METHODS USING THE SAME

CROSS-REFERENCE TO RELATED APPLICATIONS

This application is a continuation of International Application No. PCT/CN2020/101329, filed on Jul. 10, 2020, which claims priority of Chinese Patent Application No. 201910676785.7, filed on Jul. 25, 2019, the entire content of each of which is incorporated herein by reference.

TECHNICAL FIELD

The present disclosure generally relates to perimeter monitoring and intrusion detection, and in particular, to systems and methods for determining a 3-dimensional coordinate based on 2-dimensional radar detection data.

BACKGROUND

To detect and/or prevent perimeter breach, radar devices are usually used for establishing an "electronic wall" on a boundary or perimeter of a monitoring area. The radar devices can monitor a moving target by determining a coordinate of the moving target. When the moving target is detected to cross or breach a preset alarm line, the radar device(s) may generate a corresponding alarm.

Specifically, a three-dimensional (3D) coordinate of the moving target in a radar coordinate system can be determined by using a 3D radar device for monitoring the moving target. The radar coordinate system has a Z-axis vertical to the ground, a Y-axis parallel to the detection direction, and an X-axis perpendicular to the Y-axis and parallel to the ground. 3D radars in general are costly, and in some conventional approaches, two-dimensional (2D) radar devices are used instead of the 3D radar devices to reduce cost. However, the 2D radar device can only measure a distance between the moving target and the 2D radar device and an angle of the moving target with respect to the 2D radar device in the X-Y plane (parallel to the ground). When the moving target is moving along the vertical direction (i.e., the Z-axis direction), the 2D radar device cannot monitor the moving target effectively, especially before and during perimeter breach.

Therefore, it is desirable to provide effective systems and methods for determining the 3D coordinate of the moving target using the 2D radar device, thereby improving detection efficiency and reducing the cost.

SUMMARY

According to an aspect of the present disclosure, a system for determining a 3D coordinate of a moving target may be provided. The system may include at least one storage medium including a set of instructions, and at least one processor to communicate with the at least one storage medium. When executing the set of instructions, the at least one processor may obtain 2D detection data of the moving target. The 2D detection data may be generated by a 2D detection device including at least two detection assemblies. The at least two detection assemblies may be mounted at a known height above a horizontal plane along a first axis. The first axis may form a tilting angle with the horizontal plane. The at least one processor may also determine a 2D coordinate of the moving target in a first coordinate system based on the 2D detection data. The first coordinate system may be a 2D coordinate system including the first axis and a second axis that is perpendicular to the first axis. The 2D coordinate of the moving target may include a first value of the first axis and a second value of the second axis. The at least one processor may also determine the 3D coordinate of the moving target in a second coordinate system based on the 2D coordinate, the tilting angle, and the known height.

In some embodiments, the 2D detection device may be mounted on a perimeter that is substantially perpendicular to the horizontal plane. The at least one processor may further determine whether the moving target is above a preset height above the horizontal plane based on the 3D coordinate.

In some embodiments, to determine whether the moving target is above a preset height above the horizontal plane based on the 3D coordinate system, the at least one processor may determine a height of the moving target based on the 3D coordinate. The at least one processor may also determine, based on the height of the moving target and the preset height, whether the moving target is above the preset height.

In some embodiments, the 2D detection device may be mounted on a perimeter that is substantially perpendicular to the horizontal plane. The at least one processor may further determine whether the moving target is above a preset height above the horizontal plane based on the first value.

In some embodiments, to determine whether the moving target is above a preset height above the horizontal plane based on the first value, the at least one processor may determine, based on the known height and the tilting angle, a third value of the first axis corresponding to the preset height by projecting a line of the perimeter with the preset height to the first axis. The at least one processor may determine whether the moving target is above the preset height based on the first value and the third value.

In some embodiments, in response to a determination that the moving target is above the preset height, the at least one processor may further initiate an alarm for alerting a user, or initiate an alarm for alerting the moving target.

In some embodiments, the 2D detection device may be mounted on a perimeter that is substantially perpendicular to the horizontal plane. To determine a 3D coordinate of the moving target in a second coordinate system based on the 2D coordinate, the tilting angle, and the known height, the at least one processor may determine a transformation relationship between the first coordinate system and the second coordinate system based on the tilting angle and the known height. The at least one processor may also determine the 3D coordinate of the moving target in the second coordinate system based on the transformation relationship and the 2D coordinate.

In some embodiments, the second coordinate system may include a third axis, a fourth axis, and a fifth axis. The third axis may be horizontal and perpendicular to the fourth axis. The fourth axis may coincide with the second axis. The fifth axis may be vertical to the horizontal plane. To determine a transformation relationship between the first coordinate system and the second coordinate system based on the tilting angle and the known height, the at least one processor may determine, based on the tilting angle and the known height, a fourth value of the first axis corresponding to the perimeter by projecting a line formed by intersecting the perimeter and the horizontal plane to the first axis. The at least one processor may determine the transformation relationship based on the fourth value and the first value.

In some embodiments, the 2D detection data of the moving target may include a distance of the moving target and an azimuth angle of the moving target.

In some embodiments, the 2D detection device may include a 2D radar device.

According to another aspect of the present disclosure, a method for determining a 3D coordinate of a moving target is provided. The method may be implemented on a computing device having at least one processor and at least one storage device. The method may include obtaining 2D detection data of the moving target. The 2D detection data may be generated by a 2D detection device including two detection assemblies. The at least two detection assemblies may be mounted at a known height above a horizontal plane along a first axis. The first axis may form a tilting angle with the horizontal plane. The method may also include determining a 2D coordinate of the moving target in a first coordinate system based on the 2D detection data. The first coordinate system may be a 2D coordinate system including the first axis and a second axis that is perpendicular to the first axis. The 2D coordinate of the moving target may include a first value of the first axis and a second value of the second axis. The method may also include determining the 3D coordinate of the moving target in a second coordinate system based on the 2D coordinate, the tilting angle, and the known height.

In some embodiments, the 2D detection device may be mounted on a perimeter that is substantially perpendicular to the horizontal plane. The method may further include determining whether the moving target is above a preset height above the horizontal plane based on the 3D coordinate.

In some embodiments, the determining whether the moving target is above a preset height above the horizontal plane based on the 3D coordinate system may include determining a height of the moving target based on the 3D coordinate, and determining, based on the height of the moving target and the preset height, whether the moving target is above the preset height.

In some embodiments, the 2D detection device may be mounted on a perimeter that is substantially perpendicular to the horizontal plane. The method may further include determining whether the moving target is above a preset height above the horizontal plane based on the first value.

In some embodiments, the determining whether the moving target is above a preset height above the horizontal plane based on the first value may include determining, based on the known height and the tilting angle, a third value of the first axis corresponding to the preset height by projecting a line of the perimeter with the preset height to the first axis, and determining whether the moving target is above the preset height based on the first value and the third value.

In some embodiments, in response to a determination that the moving target is above the preset height, the method may further include initiating an alarm for alerting a user, or initiating an alarm for alerting the moving target.

In some embodiments, the 2D detection device may be mounted on a perimeter that is substantially perpendicular to the horizontal plane. The determining a 3D coordinate of the moving target in a second coordinate system based on the 2D coordinate, the tilting angle, and the known height may include determining a transformation relationship between the first coordinate system and the second coordinate system based on the tilting angle and the known height, and determining the 3D coordinate of the moving target in the second coordinate system based on the transformation relationship and the 2D coordinate.

In some embodiments, the second coordinate system may include a third axis, a fourth axis, and a fifth axis. The third axis may be horizontal and perpendicular to the fourth axis. The fourth axis may coincide with the second axis. The fifth axis may be vertical to the horizontal plane. The determining a transformation relationship between the first coordinate system and the second coordinate system based on the tilting angle and the known height may include determining, based on the tilting angle and the known height, a fourth value of the first axis corresponding to the perimeter by projecting a line formed by intersecting the perimeter and the horizontal plane to the first axis, and determining the transformation relationship based on the fourth value and the first value.

In some embodiments, the 2D detection data of the moving target may include a distance of the moving target and an azimuth angle of the moving target.

In some embodiments, the 2D detection device may include a 2D radar device.

According to another aspect of the present disclosure, a system for determining a 3D coordinate of a moving target is provided. The system may include an acquisition module and a determination module. The acquisition module may be configured to obtain 2D detection data of the moving target. The 2D detection data may be generated by a 2D detection device including at least two detection assemblies. The at least two detection assemblies may be mounted at a known height above a horizontal plane along a first axis. The first axis may form a tilting angle with the horizontal plane. The determination module may be configured to determine a 2D coordinate of the moving target in a first coordinate system based on the 2D detection data. The first coordinate system may be a 2D coordinate system including the first axis and a second axis that is perpendicular to the first axis. The 2D coordinate of the moving target may include a first value of the first axis and a second value of the second axis. The determination module may also be configured to determine the 3D coordinate of the moving target in a second coordinate system based on the 2D coordinate, the tilting angle, and the known height.

According to another aspect of the present disclosure, a non-transitory computer readable medium storing instructions is provided. The instructions, when executed by at least one processor, may cause the at least one processor to implement a method. The method may include obtaining 2D detection data of the moving target. The 2D detection data may be generated by a 2D detection device including at least two detection assemblies. The at least two detection assemblies may be mounted at a known height above a horizontal plane along a first axis. The first axis may form a tilting angle with the horizontal plane. The method may also include determining a 2D coordinate of the moving target in a first coordinate system based on the 2D detection data. The first coordinate system may be a 2D coordinate system including the first axis and a second axis that is perpendicular to the first axis. The 2D coordinate of the moving target may include a first value of the first axis and a second value of the second axis. The method may also include determining the 3D coordinate of the moving target in a second coordinate system based on the 2D coordinate, the tilting angle, and the known height.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
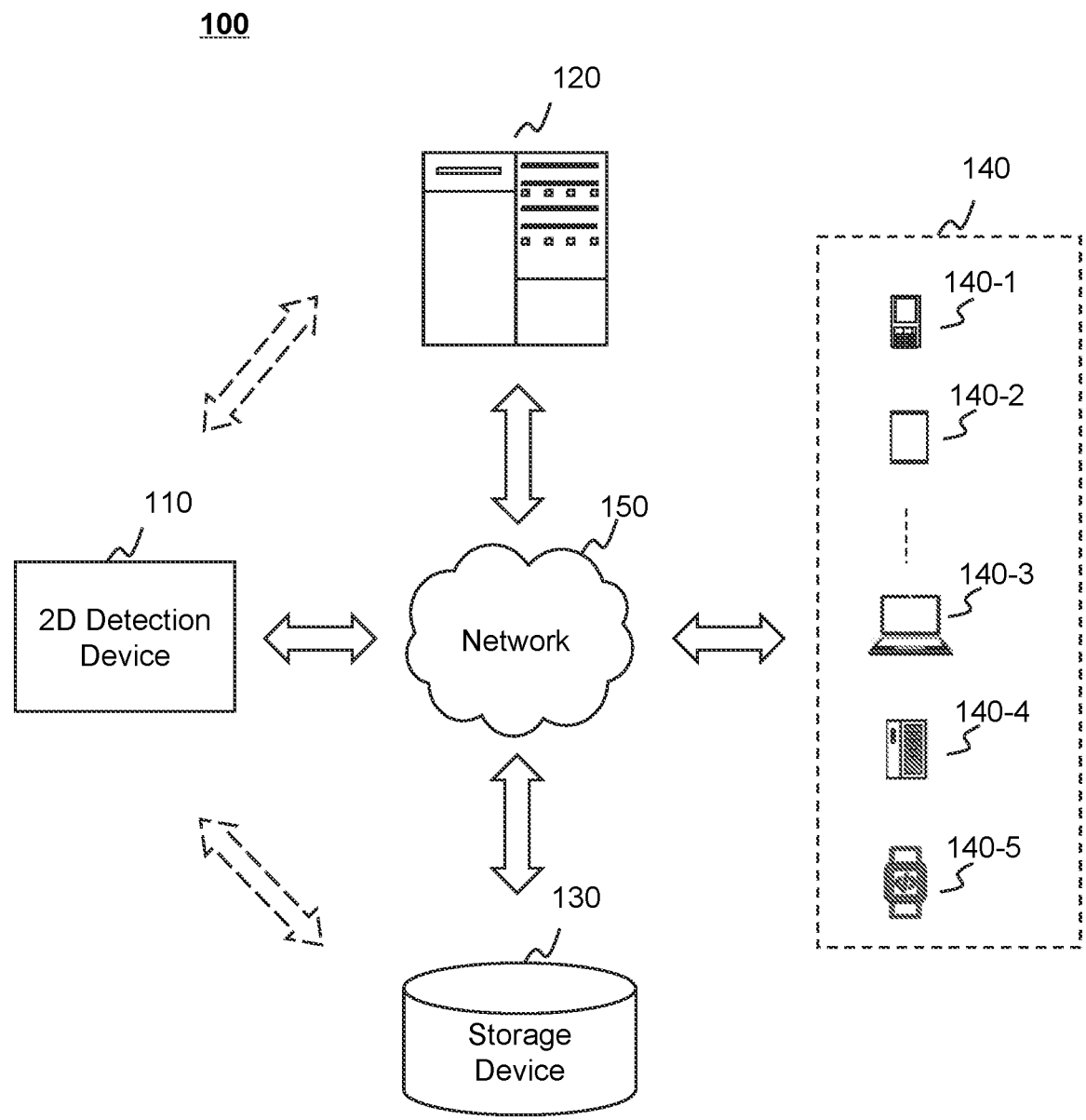
FIG. 1A illustrates a schematic diagram of an exemplary radar system according to some embodiments of the present disclosure.
Figure 1B:
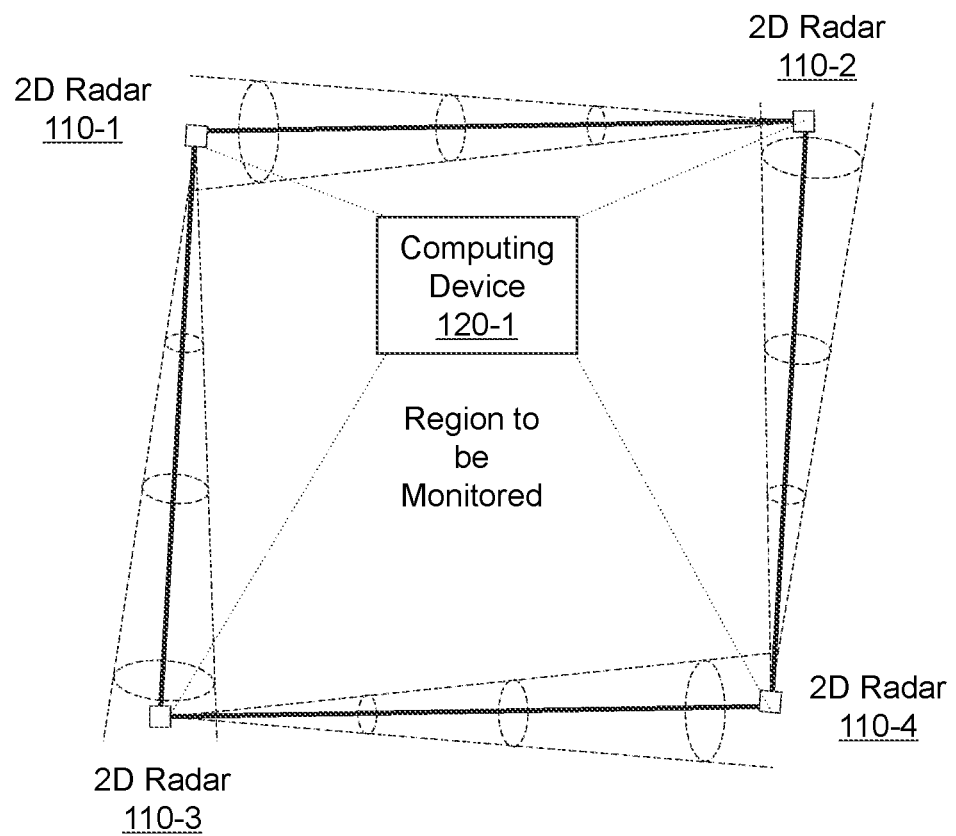
FIG. 1B is a schematic diagram illustrating an exemplary region to be monitored according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression(s) if they may achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device(s). In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., a computing device as illustrated in FIG. 4) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to a system and method for determining a 3D coordinate of a moving target. The system and method may obtain 2D detection data of the moving target. The 2D detection data may be generated by a 2D detection device including at least two detection assemblies. The at least two detection assemblies may be mounted at a known height above a horizontal plane along a first axis, which forms a tilting angle with the horizontal plane. The system and method may also determine a 2D coordinate of the moving target in a first coordinate system based on the 2D detection data. The first coordinate system may be a 2D coordinate system including the first axis and a second axis. The 2D coordinate of the moving target may include a first value of the first axis and a second value of the second axis. The system and method may further determine the 3D coordinate of the moving target in a second coordinate system based on the 2D coordinate, the tilting angle, and the known height.

According to some embodiments of the present disclosure, the system may determine a 3D coordinate of a moving target using a 2D radar detection device, indicating a vertical location of the moving target. In this way, the system may use the 2D radar detection device instead of a 3D radar detection device to determine the 3D coordinate of the moving target, which may reduce the cost of the radar system. In addition, in some embodiments, when the 2D radar detection device of the system is mounted above a perimeter, the system may generate an alarm when an intruder is climbing the perimeter, which may help to timely or in advance stop the intruder to climb over the wall and improve an efficiency of the 2D detection device.

FIG. 1A illustrates a schematic diagram of an exemplary radar system according to some embodiments of the present disclosure. The radar system may be used in various regions that are to be monitored. Exemplary regions may include a residential community, a facility factory, a military base, a nuclear power plant, a penal institution, a parking apron, or the like, requiring to be monitored to ensure that no individual enters or leaves the region in other than an authorized manner. In some embodiments, the radar system 100 may be used in conjunction with other barriers. For example, a region to be monitored may include a perimeter with (or protected by) a physical barrier such as a solid wall, a woven wire or similar construction fence. The radar system 100 may be used in conjunction with the physical barrier to monitor if there is an individual climbing or climbing over the physical barrier. The present disclosure is described with reference to the radar system 100 applied in conjunction with a perimeter with a wall. This is not intended to limit the scope of the present disclosure, and the radar system 100 may be applied individually or in conjunction with a perimeter with other barriers.

As shown in FIG. 1, the radar system 100 may include a 2D detection device (also referred to as a 2D radar or a 2D radar device) 110, a processing device (also referred to as a computing device) 120, a storage device 130, one or more terminal devices 140, a network 150, etc. The components in the radar system 100 may be connected in one or more of various ways. For example, the storage device 150 may be connected to the 2D detection device 110 directly or through the network 150. As another example, the processing device 120 may be connected to the 2D detection device 110 directly or through the network 150. In some embodiments, for a region to be monitored, the radar system 110 may include more than one 2D detection device 110. Each of the more than one 2D detection device 110 may correspond to a processing device 120, or the more than one 2D detection device 120 may share a same processing device 120. Merely by way of example, FIG. 1B is a schematic diagram illustrating an exemplary region to be monitored according to some embodiments of the present disclosure. As shown in FIG. 1B, the region to be monitored may be a quadrilateral region and four 2D detection devices 110 (i.e., a 2D detection device 110-1, a 2D detection device 110-2, a 2D detection device 110-3, and a 2D detection device 110-4) may be mounted on an end of each side of the quadrilateral region. The four 2D detection devices 110 may share a same processing device 120-1, i.e., the four 2D detection devices 110 may be capably connected to the processing device 120-1. As used herein, "the four 2D detection devices 110 may be capably connected to the processing device 120-1" may refer to that the four 2D detection devices 110 may communicate/share information with the processing device 120-1.

The 2D detection device 110 may be configured to detect a target and generate 2D detection data relating to the target. The 2D detection data relating to a target may include returned signals from the target, etc. In some embodiments, the 2D detection data relating the target may include a range of the target, an azimuth angle of the target, a velocity of the target, or the like, or any combination thereof, that may be determined based on the returned signals from the target. The range of the target may reflect a relative distance between the 2D detection device 110 and the target, and may also be referred to as a distance of the target. The azimuth angle of the target may reflect a relative direction of the target with respect to the 2D detection device 110. The target may include a person, an animal, a tree, a vehicle, etc.

The 2D detection device 110 may include a microwave radar device, a millimeter-wave radar device, a centimeter-wave radar device, etc. In some embodiments, the 2D detection device 110 may include a transmitter assembly, at least two detection assemblies (e.g., 2 detection assemblies, 4 detection assemblies, etc.), a processing assembly, etc. The transmitter assembly may be configured to generate an electromagnetic wave (e.g., a microwave, a millimeter-wave, or a centimeter-wave) and launch the electromagnetic wave for detection. The electromagnetic wave may be reflected by a target. The at least two detection assemblies may be configured to receive returned signals reflected by the target and include at least two antennas (e.g., microstrip patch antennas). The processing assembly may be configured to generate a range of the target, an azimuth angle of the target, a velocity of the target, or the like, or any combination thereof, based on the returned signals (e.g., using a time-of-flight principle, and/or a phase delay principle). In some embodiments, the returned signals of a target may reflect whether the target is a stationary target or a moving target. For example, if a frequency of a returned wave in a returned signal is the same as that of a corresponding electromagnetic wave being reflected by the target, the target may be determined to be a stationary target. Alternatively, if a value the frequency of the returned wave in the returned signal is greater or less than that of the corresponding electromagnetic wave being reflected by the target, the target may be determined to be a moving target.

Figure 1C:
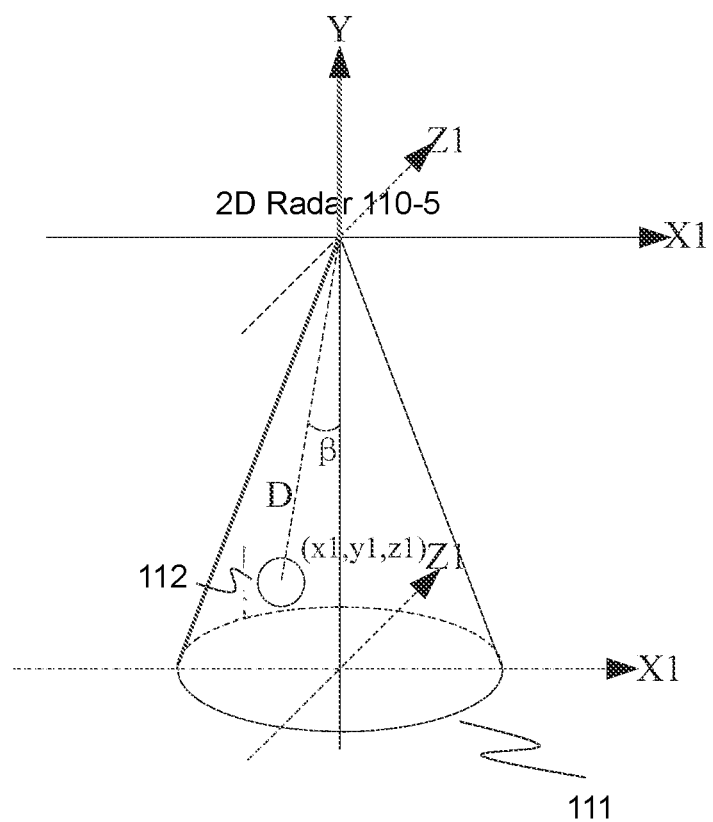
FIG. 1C illustrates a schematic diagram of an exemplary 2D detection device according to some embodiments of the present disclosure.

Merely by way of example, FIG. 1C illustrates a schematic diagram of an exemplary 2D detection device according to some embodiments of the present disclosure. The 2D detection device 110-5 may transmit an electromagnetic wave with a conical beam along a first direction to form the detection zone 111 with a conical space. The central axis of the detection zone 111 may coincide with the first direction. A 2D radar coordinate system associated with the 2D detection device 110-5 may be defined based on the first direction and one or more components of the 2D detection device 110-5. For example, the 2D detection device 110-5 may include at least two detection assemblies that are arranged along a second direction. The second direction may be perpendicular to the first direction. The 2D radar coordinate system may include an X1-axis and a Y-axis, wherein the Y-axis is defined to be parallel to the first direction, the X1-axis is defined to be parallel to the second direction, and the origin of the 2D coordinate system is defined to be a location of the 2D detection device 110-5 (e.g., a center location of the 2D detection device 110-5). When a target 112 is moving in the detection zone 111, the 2D detection device 110-5 may detect the target 112 and generate 2D detection data of the target 112. As used herein, the 2D detection data of the target 112 may refer to 2D detection data of a point associated with the target 112 (e.g., a highest point of the target 112, a lowest point of the target 112, a point of the target 112 closest to the detection device 110-5, a center of the target 112). The 2D detection data of the target 112 may include a range (or distance) of the target 112 (also designed as D in FIG. 1C) and an azimuth angle of the target 112 (also designed as β in FIG. 1C). D represents a distance between the target 112 to the origin (i.e., the 2D detection device 110-5), and β represents an angle of a line segment (that is formed by a projection of the target 112 on the X1-Y plane and the origin) and the Y-axis. D and β reflect a location of the target 112 in the X1-Y plane, and a 2D coordinate of the target 112 in the 2D radar system may be determined based on the D and β.

Figure 1D:
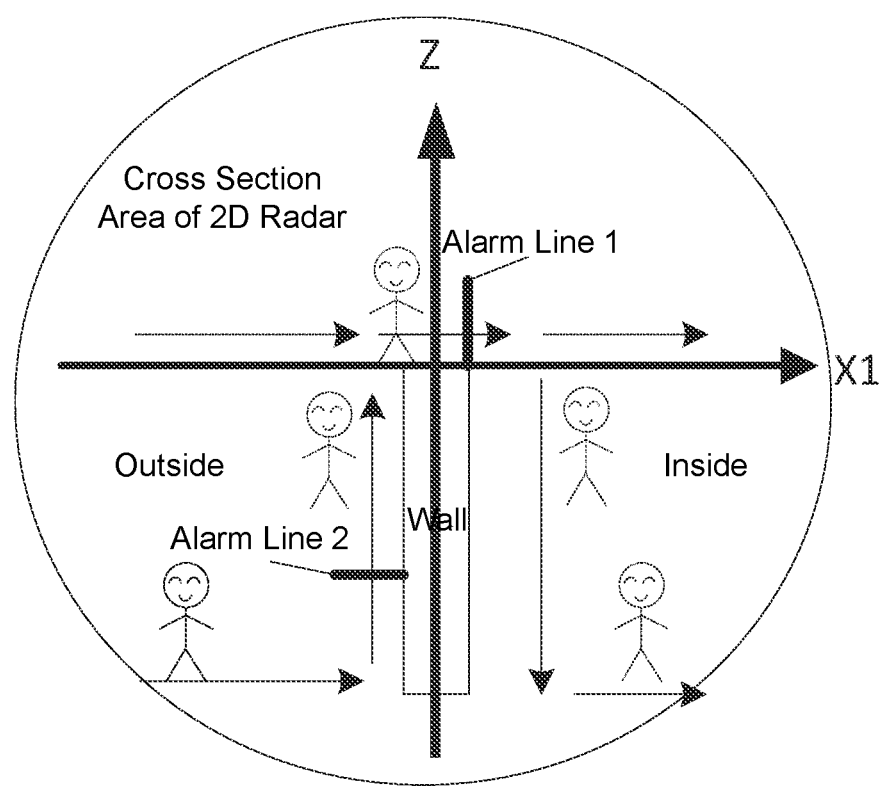
FIG. 1D is a schematic diagram illustrating an exemplary 2D detection device mounted on a wall of a region to be detected according to some embodiments of the present disclosure.

As shown in FIG. 1C, the Z1-axis is perpendicular to the X1-Y plane (i.e., Z1-axis is along a vertical direction) and passes through the origin. When the target 112 is moving along the Z1-axis, the 2D detection device 110-2 may detect that the range of the target 112 and the azimuth angle of the target 112 do not change. The 2D detection device 110-2 may not detect information/data of the target 112 along the Z1-axis. In such cases, when the 2D detection device 110-5 is mounted with the X1-Y plane of the 2D detection device 110-5 being parallel to a horizontal plane (also referred to as that the 2D detection device 110-5 is mounted parallel to the horizontal plane), the 2D detection device 110-5 may only detect the movement of a target in and/or parallel to the horizontal plane, and may not detect the movement of the target in the vertical direction. For example, when the 2D detection device 110-5 is mounted parallel to the horizontal plane on a perimeter (e.g., a wall) which is substantially perpendicular to the horizontal plane as shown in FIG. 1D, if a target is climbing the wall and substantially does not move along the X1-axis direction or the Y-axis direction (not shown in FIG. 1D), the 2D detection device 110-5 would not detect that the target is moving along the vertical direction.

In some cases, when the 2D detection device 110-5 is mounted parallel to the horizontal plane, an alarm line may be set along the Y-axis based on a target distance, i.e., the alarm will be initiated when a target is within a predetermined distance to the wall. Here, the phrase "alarm line" refers to a virtual line set for alarm triggering. However, such an approach may result in false alarm when a person next to the wall is moving along the wall, and may not be able to detect the movement of a person along the vertical direction. Alternatively, in some cases, when the 2D detection device 110-5 is mounted parallel to the horizontal plane, an alarm line (e.g., an alarm line 1 as shown in FIG. 1D) may be set away from outside of the wall based on which an alarm may be initiated only when a person climbs over the wall. However, this approach may result in late detection and it would be too late for stopping the trespassing person. In some embodiments of the present disclosure, an alarm line (e.g., the alarm line 2 as shown in FIG. 1D) may be set on the wall with a preset height above the horizontal plane using systems and methods described in the present disclosure, and an alarm may be initiated when a target (e.g., a person) passes through the alarm line 2. The 2D detection device 110-5 may detect the target before the target is climbing over the wall. More descriptions regarding setting the alarm line on the wall with a preset height above the horizontal plane may be found elsewhere in the present disclosure (e.g., FIGS. 6A-6C and the descriptions thereof).

As described in the present disclosure, the term "the 2D detection device is mounted parallel to the horizontal plane" may refer to that "the at least two detection assemblies of the 2D detection device are mounted parallel to the horizontal plane." Similarly, the term "the 2D detection device is mounted with a tilting angle" may refer to that "the at least two detection assemblies of the 2D detection device are mounted with the tilting angle." In some embodiments, the 2D detection device may include a shell (e.g., with box-shaped) to accommodate the at least two detection assemblies. When the shell is mounted parallel to the horizontal plane, a top surface and a bottom surface of the shell may be parallel to the horizontal device and four surrounding surfaces of the shell may be perpendicular to the horizontal plane. When the shell is mounted with the tilting angle, the top surface or the bottom surface may form the tilting angle with the horizontal plane. The at least two detection assemblies may be achieved to be mounted with the tilting angle to the horizontal plane according to its mounting mode in the shell of the 2D detection device. For example, the at least two detection assemblies may be mounted parallel to the shell of the 2D detection device (e.g., the at least two detection assemblies being mounted parallel to the top surface and the bottom surface). In such cases, when the shell of the 2D detection device is mounted with the tilting angle to the horizontal plane, the at least two assemblies may be mounted with the tilting angle to the horizontal plane. As another example, the at least two detection assemblies may be mounted with the tilting angle to the shell of the 2D detection device (e.g., the at least two detection assemblies being mounted with the tilting angle to the top surface and the bottom surface). In such cases, when the shell of the 2D detection device is mounted parallel to the horizontal plane, the at least two detection assemblies may be mounted with the titling angle to the horizontal plane.

The processing device 120 may process information and/or data relating to one or more components of the radar system 100 to perform one or more functions of the radar system 100 described in the present disclosure. For example, the processing device may obtain 2D detection data of a target generated by the 2D detection device 110. As another example, the processing device 120 may determine a 2D coordinate of the target based on the 2D detection data. As still another example, the processing device 120 may determine a 3D coordinate of the target based on the 2D coordinate. As further another example, the processing device 120 may determine whether the target is above a preset height above the horizontal plane. In some embodiments, the processing device 120 may include one or more processing devices (e.g., single-core processing device(s) or multi-core processor(s)). Merely by way of example, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

Merely for illustration, only one processing device may be described in the radar system 100. However, it should be noted that the radar system 100 of the present disclosure may also include multiple processing devices, and thus operations and/or method steps that are performed by one processing device as described in the present disclosure may also be jointly or separately performed by the multiple processing devices. For example, if in the present disclosure the processing device of the radar system 100 executes both operations A and operation B, it should be understood that operation A and operation B may also be performed by two or more different processing devices jointly or separately in the radar system 100 (e.g., a first processing device executes operation A and a second processing device executes operation B, or vice versa, or the first and second processing devices jointly execute operations A and B).

The storage device 130 may store data and/or instructions. For example, the storage device 130 may store 2D detection data generated by the 2D detection device. As another example, the storage device 130 may store 2D coordinates and 3D coordinates determined by the processing device 120. As still another example, the storage device 130 may store data and/or instructions that the processing device 120 may execute or use to perform exemplary methods described in the present disclosure. In some embodiments, the storage device 130 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage device 130 may include at least one network port to communicate with other components in the radar system 100. For example, the storage device 130 may be connected to a network (e.g., the network 150) to communicate with one or more components of the radar system 100 (e.g., the 2D detection device 110, the processing device 120) via the at least one network port. One or more components in the radar system 100 may access the data or instructions stored in the storage device 130 via the network. In some embodiments, the storage device 130 may be directly connected to or communicate with one or more components in the radar system 100 (e.g., the 2D detection device 110, the processing device 120). In some embodiments, the storage device 130 may be part of the processing device 120.

The terminal device(s) 140 may be any electronic device used by a user associated with the radar system 100. For example, the user may be an administrator of the 2D detection device 110, a security personnel of the region to be monitored, or the like, or any combination thereof that has an authority of the 2D detection device 110. In some embodiments, the terminal device(s) 140 may include a mobile device 140-1, a tablet computer 140-2, a laptop computer 140-3, a built-in device in a vehicle 140-4, a wearable device 140-5, or the like, or any combination thereof. In some embodiments, the mobile device 140-1 may include a smart home device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift™, a HoloLens™, a Gear VR™, etc. In some embodiments, the built-in device in the vehicle 140-4 may include an onboard computer, an onboard television, etc. In some embodiments, the wearable device 140-5 may include a smart bracelet, a smart footgear, smart glasses, a smart helmet, a smartwatch, smart clothing, a smart backpack, a smart accessory, or the like, or any combination thereof. In some embodiments, the terminal device 140 may be implemented on a computing device 200 having one or more components illustrated in FIG. 2, or a mobile device 300 having one or more components illustrated in FIG. 3 in the present disclosure.

In some embodiments, the terminal device(s) 140 may be configured to facilitate communications between a user (e.g., an administrator of the 2D detection device 110, a security personnel of the region to be monitored) and one or more components of the radar system 100. For example, the user may set a preset height of an alarm line for the radar system 100 via the terminal device 140. As another example, the processing device 120 may send an alarm (e.g., in response to determining that an individual is climbing a wall of the region to be monitored) and/or 3D coordinates of a person who is attempting to climbing the wall to the user via the terminal device 140. As still another example, the user may send a response to the processing device 120 such that the processing device 120 may initiate an alarm for alerting or reminding a person not climbing the wall. In some embodiments, "terminal device" and "user terminal" may be used interchangeably in the present disclosure.

The network 150 may facilitate the exchange of information and/or data. In some embodiments, one or more components of the radar system 100 may send or receive information and/or data to/from to other component(s) of the radar system 100. For example, the storage device 130 may obtain 2D detection data from the 2D detection device 110 via the network 150 and store the 2D detection data. As another example, the processing device 120 may obtain the 2D detection data from the storage device 130 via the network 150. As still another example, the processing device 120 may send an alarm to the terminal device(s) 140 via the network 150. In some embodiments, the network may be any type of wired or wireless network, or combination thereof. Merely by way of example, the network may include a cable network, a wireline network, an optical fiber network, a tele-communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network may include one or more network access points. For example, the network 150 may include wired or wireless network access points, through which one or more components of the radar system 100 may be connected to the network 150 to exchange data and/or information.

It should be noted that the above description regarding the radar system 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the radar system 100 may include one or more additional components and/or one or more components of the radar system 100 may be omitted. For example, the radar system 100 may include any other detection devices such as an image acquisition device. The image acquisition device may be in conjunction with the radar device 110 to protect the region to be monitored. As another example, the network 150 and/or the storage device(s) may be omitted. In some embodiments, one or more components of the radar system 100 may be integrated into one component, or one component of the radar system 100 may be divided into multiple components. For example, the computing device 120 and the storage device 140 may be integrated into one component. As another example, the 2D detection device 110 and the computing device 120 may be integrated into one component. In some embodiments, the 2D detection device 110 may generate 2D detection data of a target including the own height of the target (e.g., a human height of a person).

Figure 2:
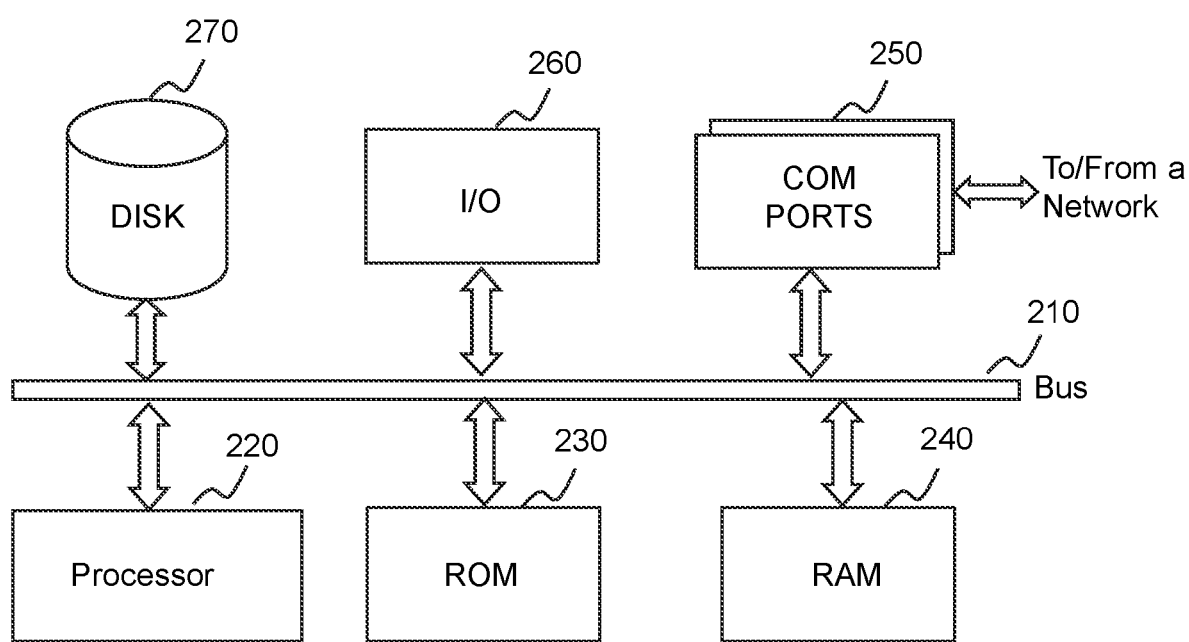
FIG. 2 is a schematic diagram illustrating exemplary hardware and/or software components of a computing device according to some embodiments of the present disclosure.

FIG. 2 is a schematic diagram illustrating exemplary hardware and/or software components of a computing device according to some embodiments of the present disclosure. The computing device 200 may be used to implement any component of the radar system 100 as described herein. For example, the processing device 120 and/or the terminal device(s) 140 may be implemented on the computing device 200, respectively, via its hardware, software program, firmware, or a combination thereof. Although only one such computing device is shown, for convenience, the computer functions relating to the processing device 120 of the radar system 100 as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the terminal (s) 120) in the radar system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. Exemplary RAM may include a dynamic RAM (DRAM), a synchronous dynamic RAN (SDRAN), an enhanced synchronous dynamic RAM (ESDRAM), a synchlink dynamic RAM (SLDRAM), a Rambus dynamic RAM (RDRAM), a Rambus direct RAM (RDRAM'), a direct Rambus dynamic RAM (DRDRAM), a double date rate synchronous dynamic RAM (DDR SDRAM), a static RAM (SRAM), a thyristor RAM (T-RAM), and a zero-capacitor RAM (Z-RAM), etc. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
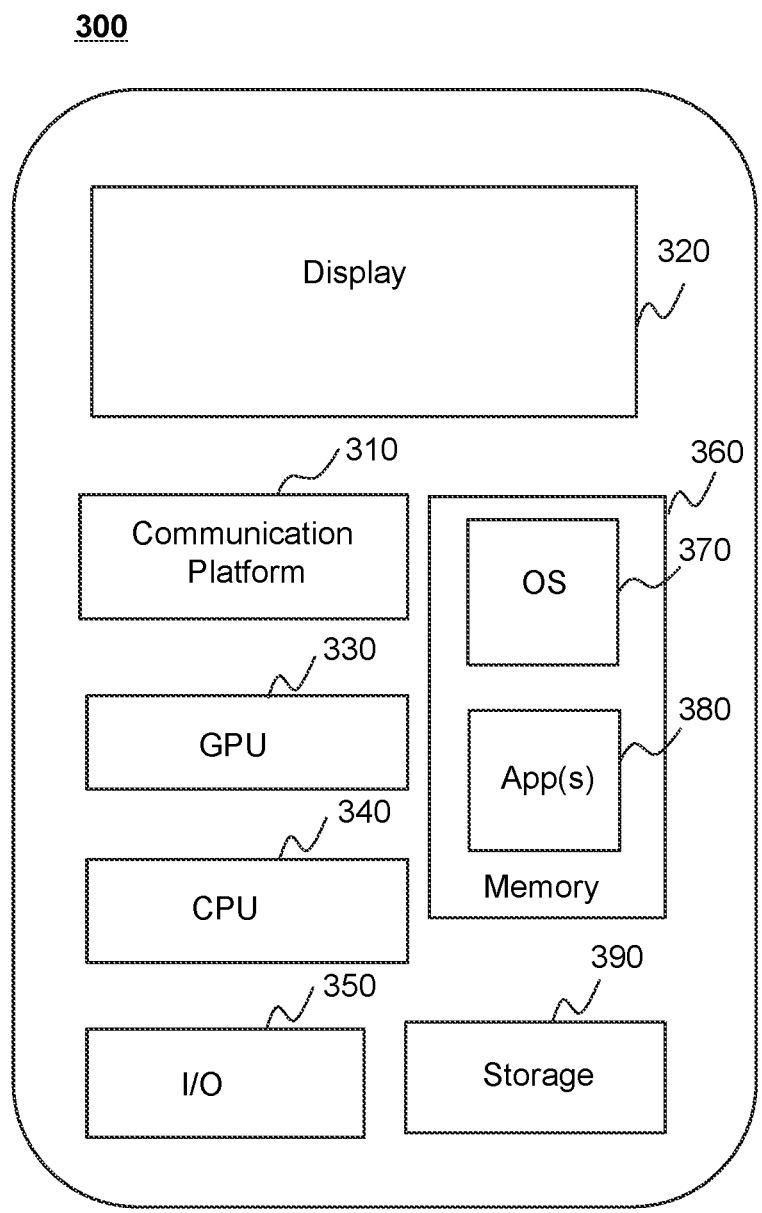
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device according to some embodiments of the present disclosure. In some embodiments, one or more components (e.g., the processing device 120, the terminal device 140) of the radar system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 120. User interactions with the information stream may be achieved via the I/O 350 and provided to the processing device 120 and/or other components of the radar system via a network (e.g., a network as aforementioned elsewhere in the present disclosure).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4A:
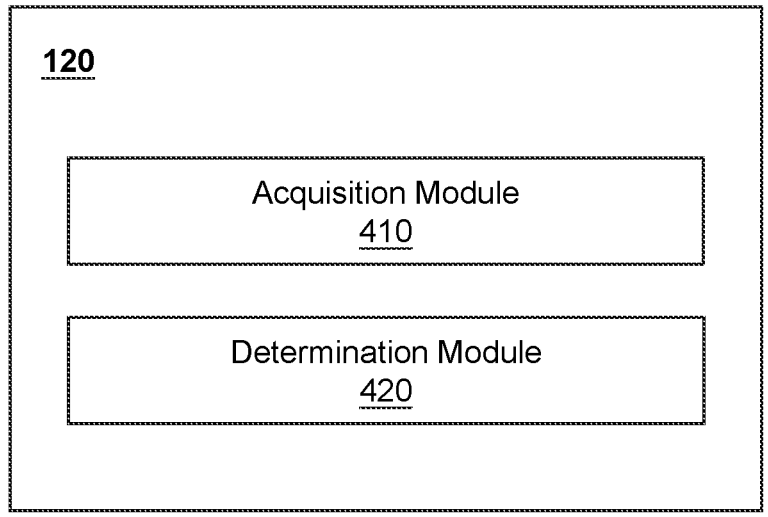
FIG. 4A is a schematic diagram illustrating an exemplary processing device according to some embodiments of the present disclosure.

FIG. 4A is a schematic diagram illustrating an exemplary processing device according to some embodiments of the present disclosure. As shown in FIG. 4A, the processing device 120 may include an acquisition module 410, and a determination module 420.

The acquisition module 410 may be configured to obtain information/data from one or more components of the radar system 100. For example, the acquisition module 410 may obtain 2D detection data of a moving target from a 2D detection device (e.g., the 2D detection device 110) that detects the moving target or a storage device (e.g., the storage device 130, the ROM 230, the RAM 240, and/or the storage 390) that stores the 2D detection data. The 2D detection data may include at least a range of the moving target and an azimuth angle of the moving target. As another example, the acquisition module 410 may obtain a conversion relationship of the 2D detection data and a 2D coordinate in a first coordinate system (e.g., a 2D coordinate system of the 2D detection device) from a storage device (e.g., the storage device 130, the ROM 230, the RAM 240, and/or the storage 390). As still another, the acquisition module 410 may obtain a known height and a tilting angle associated with the 2D detection device from a storage device (e.g., the storage device 130, the ROM 230, the RAM 240, and/or the storage 390). More descriptions regarding the 2D detection data, the known height, the tilting angle, and/or the conversation relationship may be found elsewhere in the present disclosure (e.g., FIGS. 1, 5 and the descriptions thereof).

The determination module 420 may be configured to determine coordinates of the moving target for monitoring the moving target. For example, the determination module 420 may determine a 2D coordinate of the moving target in the first coordinate system based on the 2D detection data of the moving target and the corresponding conversion relationship. As another example, the determination module 420 may determine a 3D coordinate of the moving target in a second coordinate system based on the 2D coordinate of the moving target, the known height, and the tilting angle. As still another example, the determination module 420 may monitor the moving target based on the coordinates of the moving target (e.g., the 2D coordinate and/or the 3D coordinate). The determination module 420 may monitor the moving target based on an alarm strategy, and generate one or more alarms to alert the moving target and/or a user of the radar system 100 (e.g., an administrator of the 2D detection device, a security personnel of the region to be monitored).

Figure 4B:
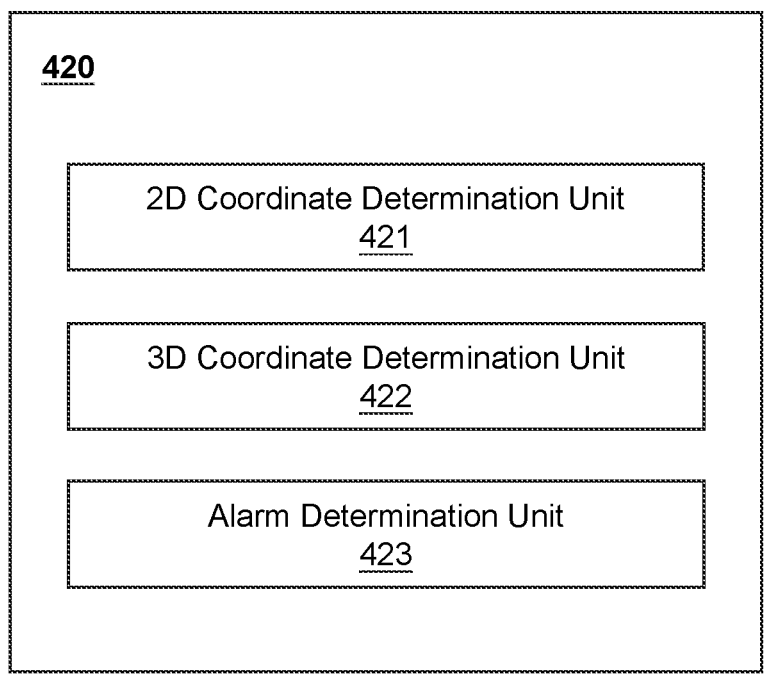
FIG. 4B is a schematic diagram illustrating an exemplary determination module according to some embodiments of the present disclosure.

In some embodiments, the determination module 420 may include one or more units to perform functions of the determination module 420. For example, FIG. 4B is a schematic diagram illustrating an exemplary determination module according to some embodiments of the present disclosure. As shown in FIG. 4B, the determination module 420 may include a 2D coordinate determination unit 421, a 3D coordinate determination unit 422, and an alarm determination unit 423. The 2D coordinate determination unit 421 may be configured to determine a 2D coordinate of a moving target in a first coordinate system. The 3D coordinate determination unit 422 may be configured to determine a 3D coordinate of the moving target in a second coordinate system. The alarm determination unit 423 may be configured to determine whether a condition is satisfied for generating an alarm based on an alarm strategy. More descriptions regarding the determination of the coordinates of the moving target, monitoring the moving target and/or the generation of the alarm(s) may be found elsewhere in the present disclosure (e.g., FIGS. 5-8 and the descriptions thereof.

It should be noted that the above descriptions of the processing device 120 and/or the determination module 420 are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. In some embodiments, two or more of the modules (or units) may be combined into a single module (or unit), and any one of the modules may be divided into two or more units. For example, the 2D coordinate determination unit 421 and the 3D coordinate determination unit 422 may be integrated into a single unit. As another example, the alarm determination unit 423 may be divided into units to determine an abnormality of a moving target and send an alarm respectively. In some embodiments, one or more of the modules mentioned above may be omitted and/or one or more additional modules may be added in the processing device 120. For example, the processing device 120 may further include a storage module. As another example, the processing device 120 may further include a transmission module configured to exchange information/data with one or more components of the radar system 100. For example, the transmission module may send the alarm(s) to a terminal device (e.g., the terminal device 140) for the user. As another example, the transmission module may receive a feedback from the user by the terminal device for initiating or stopping an alarm sound to the moving target.

Figure 5:
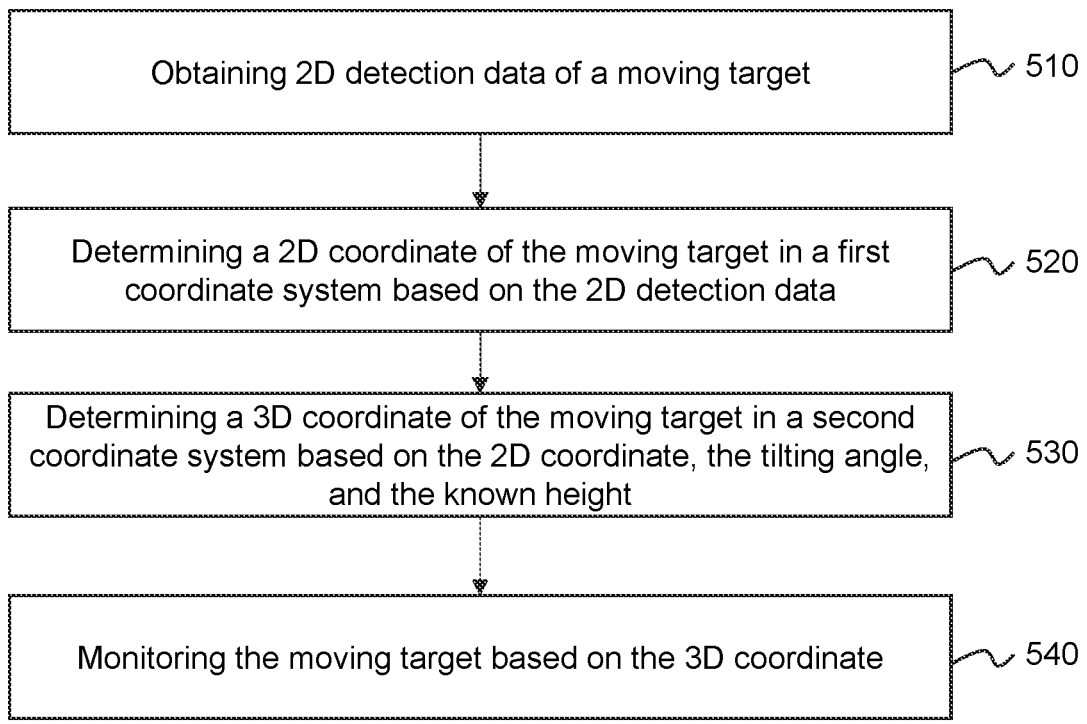
FIG. 5 is a flowchart of an exemplary process for monitoring a moving target according to some embodiments of the present disclosure.

FIG. 5 is a flowchart of an exemplary process 500 for monitoring a moving target according to some embodiments of the present disclosure. In some embodiments, one or more operations in the process 500 may be implemented in the radar system 100 illustrated in FIG. 1. For example, one or more operations in the process 500 may be stored in a storage device (e.g., the storage device 130, the ROM 230, the RAM 240, and/or the storage 390) as a form of instructions, and invoked and/or executed by a processing device 120 (e.g., the processor 220, the CPU 340, and/or one or more modules illustrated FIGS. 4A and 4B) of the radar system 100. The operations of the illustrated process presented below are intended to be illustrative. In some embodiments, the process 500 may be accomplished with one or more additional operations not described and/or without one or more of the operations discussed. Additionally, the order in which the operations of the process 500 as illustrated in FIG. 5 and described below is not intended to be limiting.

In 510, the processing device 120 (e.g., the acquisition module 410) may obtain 2D detection data of the moving target. The 2D detection data may be generated by a 2D detection device (e.g., the 2D detection device 110) including at least two detection assemblies. The at least two detection assemblies may be mounted at a known height above a horizontal plane along a first axis. The first axis may form a tilting angle with the horizontal plane.

In some embodiments, the processing device 120 may determine an object being a moving object based on velocity data of the object and/or a comparison of two scans. For example, the 2D detection device may detect a plurality of stationary objects (e.g., formed by background reflection), and filter the stationary objects as velocities thereof are zero. In some embodiments, the 2D detection device may determine a moving object being a moving target by ignoring disturbing moving objects (e.g., a shaking tree, a fluttering garbage, a bird, a rabbit or other small ground animals). Merely by way of example, the 2D detection device may recognize a moving object (e.g., a size thereof) and filter the disturbing moving objects based on the sizes thereof.

In some embodiments, the 2D detection device may generate the 2D detection data of the moving target. The processing device 120 may directly obtain the 2D detection device of the moving target from the 2D detection device. In some embodiments, the 2D detection data of the moving target may be stored in a storage device (e.g., the storage device 130, the ROM 230, the RAM 240, and/or the storage 390). The processing device 120 may retrieve the 2D detection data of the moving target from the storage device.

Figure 6A:
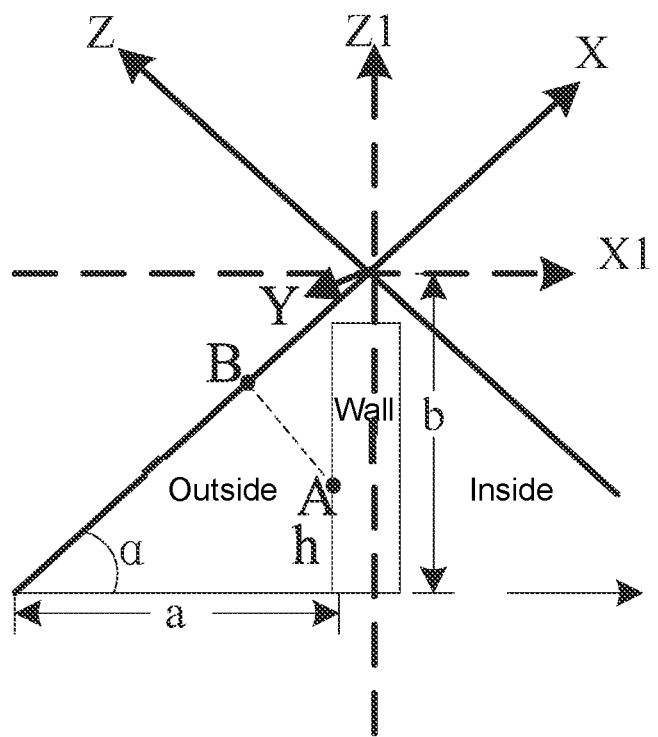
FIG. 6A is a schematic diagram illustrating an exemplary 2D detection device mounted on a wall of a region to be detected according to some embodiments of the present disclosure.

In some embodiments, the 2D detection device including at least two detection assemblies may be mounted on a perimeter of a region to be detected. Taking the perimeter of a wall as an example, FIG. 6A is a schematic diagram illustrating an exemplary 2D detection device mounted on a wall of a region to be detected according to some embodiments of the present disclosure. As shown in FIG. 6A, the wall may be constructed on the horizontal plane and be substantially perpendicular to the horizontal plane. The at least two detection assemblies may be arranged in parallel and be mounted at the known height (also referred to as b as shown in FIG. 6A) above the horizontal plane along the first axis (i.e., an X-axis as shown in FIG. 6A) (also referred to as that the 2D detection device is mounted with the tilting angle). The X-axis may form the tilting angle (also referred to as a as shown in FIG. 6A) with the horizontal plane outside of the wall. In such occasions, the moving target may refer to a person and the 2D detection device may generate 2D detection data of the person including at least a range of the person, and an azimuth angle of the person. In some embodiments, the tilting angle α may range from 0° to 90° (e.g., 30°-60°). In some embodiments, the size of a detection zone of the 2D detection device outside the wall may be associated with a detection capacity of the 2D detection device and/or the tilting angle α. Merely by way of example, the detection zone of the 2D detection device outside the wall may include the ground with a length (a as shown in FIG. 6A) and the wall with the known height b. The known height b may not change with a fixed value and the length a may be equal to b/tan α (i.e., a=b/tan α). The smaller the tilting angle α is, the larger the length a may be, and the large the size of the detection zone of the 2D detection device outside the wall may be.

In 520, the processing device 120 (e.g., the 2D coordinate determination unit 421 of the determination module 420) may determine a 2D coordinate of the moving target in a first coordinate system based on the 2D detection data. The first coordinate system may include the first axis (i.e., the X-axis) and a second axis (i.e., the Y-axis). The 2D coordinate of the moving target may include a first value of the first axis and a second value of the second axis.

In some embodiments, the first coordinate system may be defined the same as or similar to the 2D radar coordinate system as described in FIG. 1A. As shown in FIG. 6A, taking the 2D detection device mounted on the wall as an example, if the 2D detection device is mounted parallel to the horizontal plane, the Y-axis of the 2D radar coordinate system may be parallel to an extension direction of the wall, and the X1-axis of the 2D radar coordinate system may be perpendicular to the Y-axis and parallel to the horizontal plane, i.e., perpendicular to the wall. The 2D detection device in the present disclosure may be mounted with the tilting angle, and the first coordinate system may be seen as being determined by rotating the 2D radar coordinate system by an angle (with a value equal to that of the tilting angle) along the Y-axis, i.e., the Y-axis of the first coordinate system may be the same as that of the 2D radar coordinate system, the X-axis of the first coordinate system may be perpendicular to the Y-axis and form the tilting angle with the horizontal plane, and the origin of the first coordinate system may be the 2D detection device similar to that of the 2D radar coordinate system.

In some embodiments, the 2D coordinate of the moving target may be determined based on a conversion relationship of the 2D detection data and the 2D coordinate. For example, the conversion relationship may be preset and stored in a storage (e.g., the storage 130, the ROM 230, the RAM 240, and/or the storage 390). The processing device 120 may retrieve the conversion relationship from the storage device. The processing device 120 may determine the 2D coordinate based on the 2D detection data and the conversion relationship. Taking FIG. 6A as an example, the azimuth angle of the moving target may be designated to be positive in the third quadrant of the X-Y plane and be negative in the fourth quadrant of the X-Y plane. The conversion relationship may include $x=-D \sin \beta$, and $y=-D \cos \beta$, wherein x represents the first value of the first axis, y represents the second value of the second axis, D represents the range of the moving target, and β represents the azimuth angle of the moving target. The 2D coordinate of the moving target may be represented by (x, y).

In 530, the processing device 120 (e.g., the 3D coordinate determination unit 422 of the determination module 420) may determine a 3D coordinate of the moving target in a second coordinate system based on the 2D coordinate, the tilting angle, and the known height.

In some embodiments, the second coordinate system may be a 3D coordinate system (e.g., a 3D cartesian coordinate system) including a third axis, a fourth axis, and a fifth axis. In some embodiments, the second coordinate system may be defined based on the 2D detection device. For example, the origin of the second coordinate system may be the 2D detection device. As shown in FIG. 6A, the second coordinate system may be defined to include the X1-axis (i.e., the third axis), the Y-axis (i.e., the fourth axis), and the Z1-axis (i.e., the fifth axis). That is, the third axis may be defined to be horizontal and perpendicular to the fourth axis, the fourth axis may be defined to coincide with the second axis (i.e., the Y-axis), and the fifth axis may be defined to be vertical to the horizontal plane. As another example, the origin of the second coordinate system may be a projection point of the 2D detection device on the horizontal plane. The third axis may be perpendicular to the wall as shown in FIG. 6A, the fourth axis may be parallel to the Y-axis (i.e., the second axis), and the fifth axis may be vertical to the horizontal plane. Directions of the third axis, the fourth axis and the fifth axis may be set according to different occasions, and be not intended to be limiting. In some embodiments, the 3D coordinate of the moving target may include a value of the third axis, a value of the fourth axis, a value of the fifth axis, or any combination thereof. For example, the 3D coordinate of the moving target may be represented by (x', y', z'), wherein x' represents the value of the third axis, y' represents the value of the fourth axis, and z' represents the value of the fifth axis.

In some embodiments, when the first coordinate system and the second coordinate system are determined, a transformation relationship between the first coordinate system and the second coordinate system may be determined. The transformation relationship may be stored in a storage device (e.g., the storage device 130, the ROM 230, the RAM 240, and/or the storage 390). The processing device 120 may obtain the transformation relationship from the storage device. In some embodiments, the processing device 120 may obtain the known height and the tilting angle. The processing device 120 may determine the transformation relationship between the first coordinate system and the second coordinate system based on the tilting angle and the known height. In some embodiments, the processing device 120 may determine the 3D coordinate based on the 2D coordinate and the transformation relationship. More descriptions regarding the determination of the 3D coordinate of the moving target may be found elsewhere in the present disclosure (e.g., FIG. 6B and the descriptions thereof).

In 540, the processing device 120 (e.g., the alarm determination unit 423 of the determination module 420) may monitor the moving target based on the 3D coordinate.

The 2D detection device 120 may monitor the moving target by detecting the moving target continuously and the processing device 120 may determine 3D coordinates of the moving target continuously. The processing device 120 may determine an alarm based on the 3D coordinates using an alarm strategy which may reduce false alarms. For example, an alarm strategy may divide an alarm into three levels including a level-I alarm, a level-II alarm and a level-III alarm based on the 3D coordinate. The level-I alarm may have a relatively low emergency degree; the level-II alarm may have a medium emergency degree, and the level-III alarm may have a relatively high emergency degree.

Figure 6B:
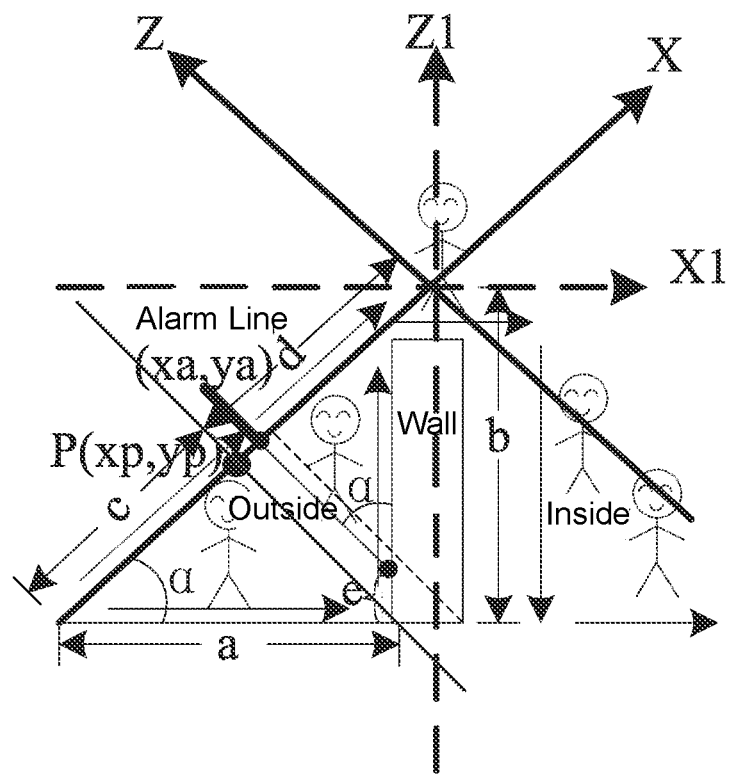
FIG. 6B is a schematic diagram illustrating an exemplary 2D detection device mounted on a wall of a region to be detected according to some embodiments of the present disclosure.

In some embodiments, the processing device 120 may determine a distance of the moving target from the wall based on the 3D coordinate (e.g., the value of the third axis (i.e., the X1-axis) of the 3D coordinate as shown in FIG. 6B) when the moving target enters the detection zone of the 2D detection device. The processing device 120 may determine whether the distance is smaller than a first threshold (e.g., 1 meter, 0.5 meters). In response to a determination that the distance is smaller than a first threshold, the processing device 120 may further determine whether distances of the moving target from the wall during a time period (e.g., 3 minutes, 4 minutes) are smaller than the first threshold. In response to a determination that distances of the moving target from the wall during a time period are smaller than a first threshold, the processing device 120 may initiate the level-I alarm. For example, the processing device 120 may initiate a warning voice such as "please keep way" for advising the moving target to be away from the wall. As another example, the processing device 120 may initiate an image acquisition device associated with the radar system 100 to capture images of the moving target. As still another example, the processing device 120 may send a warning alarm to the terminal device(s) 140 for reminding the user of the terminal device 140 to keep an eye on the moving target, wherein the warning alarm includes the 3D coordinates of the moving target.

In some embodiments, the processing device 120 may determine whether the moving target is above a preset height that is above the horizontal plane based on the 3D coordinate and/or the 2D coordinate. The preset height may be set by an administrator of the 2D detection device or a default setting of the radar system 100. Merely by way of example, FIG. 6B is a schematic diagram illustrating an exemplary 2D detection device mounted on a wall of a region to be detected according to some embodiments of the present disclosure. As shown in FIG. 6B, an alarm line (i.e., a line of the wall with the preset height) above the horizontal plane may be set on the wall. The preset height may be represented by e as shown in FIG. 6B. Exemplary e may be a value larger than a height of a normal person such as 2 meters, 2.2 meters or 2.4 meters. For example, the processing device 120 may determine a height of the moving target (e.g., a height of the highest point of the moving target from the horizontal plane) based on the 3D coordinate of the moving target according to equation (1) as follows:

$$H = b - |z'|, \tag{1}$$

where H represents the height of the moving target, b represents the known height, and |z'| represents an absolute value of the fifth value of the 3D coordinate of the moving target along the Z1-axis. The processing device 120 may compare the height of the moving target and the preset height e. If the height of the moving target is greater than the preset height, the processing device 120 may determine that the moving target is above the alarm line. If the height of the moving target is less than the preset height, the processing device 120 may determine that the moving target is under the alarm line. It should be noted that if the height of the moving target is equal to the preset height, the processing device 120 may determine that the moving target is above or under the alarm line according to a setting by the user of the system 100 or a default setting of the system 100.

Figure 6C:
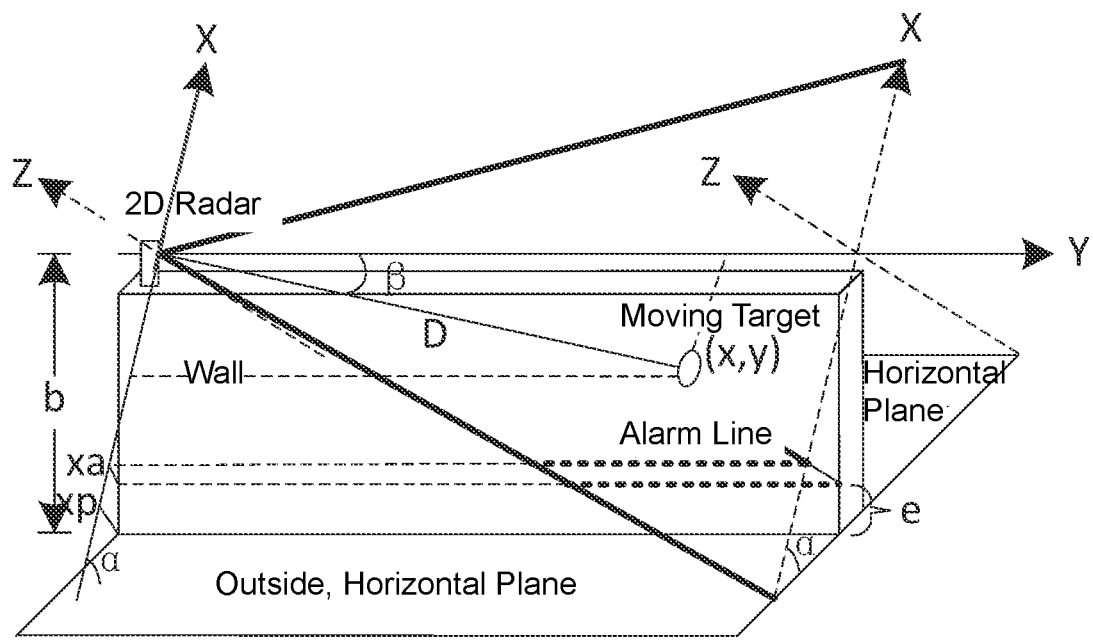
FIG. 6C is a schematic diagram illustrating an exemplary 2D detection device mounted on a wall the processing device 120 according to some embodiments of the present disclosure.

As another example, FIG. 6C is a schematic diagram illustrating an exemplary 2D detection device mounted on a wall the processing device 120 according to some embodiments of the present disclosure. FIG. 6C is from a perspective view of facing the X-Z plane, while FIG. 6B is from a perspective view of facing the X1-Z plane. The processing device 120 may determine a third value of the first axis (i.e., the X-axis) corresponding to the preset height. For example, the processing device 120 may project the alarm line to the first axis (i.e., the X-axis). The processing device 120 may determine a coordinate corresponding to the alarm line, i.e., a coordinate (xa, ya) as shown in FIG. 6B. The xa may be designed as the third value of the first axis corresponding to the preset height. The coordinate (xa, ya) may correspond to a line (i.e. a line denoted as x=xa as shown in FIG. 6C) and ya may be any value. xa may be determined according to equation (2) as follows:

$$xa = -(b - e)\sin\alpha, \qquad (2)$$

where xa represents the third value of the first axis corresponding to the preset height, b represents the known height where the 2D detection device is mounted, e represents the preset height, and a represents the tilting angle. The processing device 120 may compare the first value of the first axis of the 2D coordinate of the moving target and the third value of the first axis corresponding to the preset line, e.g., by determining whether the first value is greater than the third value in the first coordinate system as shown in FIG. 6B or FIG. 6C. If the first value is greater than the third value, the processing device 120 may determine that the moving target is above the alarm line. If the first value is less than the third value, the processing device 120 may determine that the moving target is under the alarm line. It should be noted that if the first value is equal to the third value, the processing device 120 may determine that the moving target is above or under the alarm line.

In response to a determination that the moving target is above the present height, the processing device 120 may determine that the moving target may be climbing the wall and initiate the level-II alarm. For example, the processing device 120 may initiate a warning voice such as "stop climbing, dangerous" for advising the moving target to do not climb the wall. As another example, the processing device 120 may send an alarm to the terminal device(s) 140 for reminding the user of the terminal device 140 to especially focus on the moving target, wherein the warning alarm includes the 3D coordinates and/or images of the moving target. In some embodiments, the user of the terminal device 140 (e.g., an administrator of the 2D detection device, a security personnel of the region to be detected) may take action to prevent the moving target from climbing the wall based on the alarm. For example, the user may be dispatched to where the moving target is located based on the 3D coordinate. As another example, the user may determine that the moving target is not an intruder (e.g., the moving target being a maintenance personnel) based on the images and send a feedback to the processing device 120 via the terminal device 140. The feedback may include stopping sending alarms of the moving target.

In some embodiments, the processing device 120 may determine whether the moving target is above the known height based on the 3D coordinate (e.g., the value of the fifth axis (i.e., the Z1-axis) of the 3D coordinate as shown in FIG. 6B). The processing device 120 may compare the height of the moving target with the known height. If the height of the moving target is substantially equal to or greater than the known height, the processing device 120 may determine that the moving target is above the known height and/or the moving target may climb over the wall. In response to a determination that the moving target is above the known height and/or the moving target may climb over the wall, the processing device 120 may initiate the level-III alarm. For example, the processing device 120 may initiate an alarm sound with a relative high decibel for alerting the moving target to stop climbing over the wall. As another example, the processing device 120 may send an alarm to the terminal device(s) 140 for alerting the user of the terminal device 140, wherein the warning alarm may include the 3D coordinates of the moving target and/or images of the moving target. In some embodiments, the user may take action to prevent the moving target from climbing over the wall based on the alarm. For example, the user may be dispatched to the location of the moving target based on the 3D coordinates of the moving target and/or apprehend the moving target. As another example, the user may determine that the moving target is not an intruder and send a feedback to the processing device 120. The feedback may include a request for stopping the alarm sound.

In some embodiments, the 3D coordinate may directly indicate a real-time location of the moving target, and the processing device 120 may determine whether the moving target is outside of the wall, on the wall, or inside the wall. For example, when the value of the third axis of the 3D coordinate is approximately equal to 0 (e.g., x'=0), the processing device 120 may determine that the moving target is on the wall. As another example, when the value of the fifth axis is equal to −b (i.e., z'=−b) and the value of the third axis is less than zero (i.e., x'<0), the processing device 120 may determine that the moving target is on the ground (i.e., the horizontal plane) outside the wall. As still another example, when the value of the fifth axis is equal to −b (i.e., z'=−b) and the value of the third axis is larger than zero (i.e., x'>0), the processing device 120 may determine that the moving target is on the ground (i.e., the horizontal plane) inside the wall. As still another example, when the value of the third value is less than zero (i.e., x'<0) and the value of the fifth axis ranges from −b to zero (e.g., −b<z'<0), the processing device 120 may determine that the moving target is on the outside wall. As still another example, when the value of the third value is greater than zero (i.e., x'>0) and the value of the fifth axis ranges from −b to zero (e.g., −b<z'<0), the processing device 120 may determine that the moving target is on the inside wall.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 500 and/or one or more operations of the process 500 described above may be omitted. For example, operations 520 may be omitted and be integrated into the operations 530. As another example, an additional operation may be added between operations 510 and 520 for filtering disturbing moving targets. In some embodiments, the 3D coordinates of the moving target may be used to analyze real-time velocity, generate moving trajectory, analyze behavior motivation, or the like, or any combination thereof, which may further used to monitor the moving target. In some embodiments, the level-I alarm, the level-II alarm and the level-III alarm may be described for illustration, and may not be limiting. The alarm strategy may divide the alarm into at least one, or the like, or any combination thereof the level-I alarm, the level-II alarm and the level-III alarm.

Figure 7:
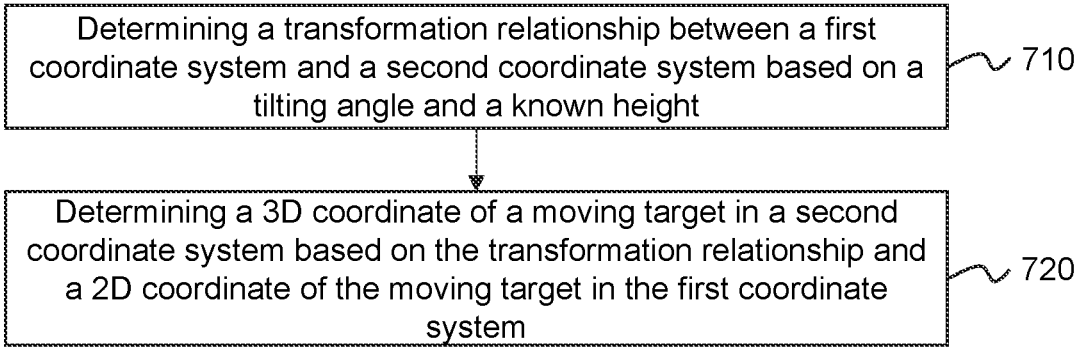
FIG. 7 is a flowchart of an exemplary process for determining a 3D coordinate of a moving target according to some embodiments of the present disclosure.

FIG. 7 is a flowchart of an exemplary process 700 for determining a 3D coordinate of a moving target according to some embodiments of the present disclosure. In some embodiments, one or more operations in the process 700 may be implemented in the radar system 100 illustrated in FIG. 1. For example, one or more operations in the process 700 may be stored in a storage device (e.g., the storage device 130, the ROM 230, the RAM 240, and/or the storage 390) as a form of instructions, and invoked and/or executed by a processing device 120 (e.g., the processor 220, the CPU 340, and/or one or more modules illustrated FIGS. 4A and 4B) of the radar system 100. The operations of the illustrated process presented below are intended to be illustrative. In some embodiments, the process 700 may be accomplished with one or more additional operations not described and/or without one or more of the operations discussed. Additionally, the order in which the operations of the process 700 as illustrated in FIG. 7 and described below is not intended to be limiting. In some embodiments, one or more operations of the process 700 may be performed to achieve at least part of operation 530 as described in connection with FIG. 5.

In 710, the processing device 120 (e.g., the 3D coordinate determination unit 422 of the determination module 420) may determine the transformation relationship between the first coordinate system and the second coordinate system based on the tilting angle and the known height.

In some embodiments, the processing device 120 may determine, based on the tilting angle and the known height, a fourth value of the first axis corresponding to the perimeter by projecting a line formed by intersecting the perimeter and the horizontal plane to the first axis. As shown in FIG. 6B, taking the perimeter of a wall as an example, the line formed by intersecting the perimeter and the horizontal plane may refer to a line formed by intersecting the outside wall and the horizontal plane (also referred to as an intersection line). The processing device 120 may project the intersection line to the first axis (i.e., the X-axis) and determine a coordinate corresponding to the intersection line, i.e., a point P with a coordinate (xp, yp) as shown in FIG. 6B. The xp may be the fourth value of the first axis corresponding to the perimeter. The point P may correspond to a line and yp may be any value. xp may be determined according to equation (3) as follows:

$$xp = -b\sin\alpha, \quad (3)$$

where xp represents the fourth value of the first axis corresponding to the perimeter, b represents the known height, and α represents the tilting angle. xp may be a boundary of segment c and segment d as shown in FIG. 6B.

In some embodiments, the processing device 120 may determine the transformation relationship based on the fourth value and the first value. For example, as shown in FIG. 6B, the processing device 120 may determine whether the moving target is moving on the ground or on the wall by comparing the fourth value (i.e., xp) and the first value (i.e., x as shown in FIG. 6C). If the first value is less than the fourth value (i.e., x<xp, or x is on the segment c), the processing device 120 may designate that the moving target is on the ground. The processing device 120 may determine the transformation relationship according to equations (4) as follows:

$$x' = (b + x\sin\alpha - b\cos 2\alpha)/(\sin\alpha\cos\alpha); \quad (4)$$

$$y' = y;$$

$$z' = -b;$$

If the first value is greater than the fourth value (i.e., x>xp, or x is on the segment d), the processing device 120 may designate that the moving target is on the wall. The processing device 120 may determine the transformation relationship according to equations (5) as follows:

$$x' = 0; \quad (5)$$

$$y' = y;$$

$$z' = x/\sin\alpha;$$

where (x', y', z') represents the 3D coordinate of the moving target in the second coordinate, (x, y) represents the 2D coordinate of the moving target in the first coordinate system, b represents the known height, and a represents the tilting angle.

In 720, the processing device 120 (e.g., the 3D coordinate determination unit 422 of the determination module 420) may determine the 3D coordinate of the moving target in the second coordinate system based on the transformation relationship and the 2D coordinate of the moving target.

When the first value is less than the fourth value, the processing device 120 may determine the 3D coordinate of the moving target based on the 2D coordinate according to equation (4). When the first value is greater than the fourth value, the processing device 120 may determine the 3D coordinate of the moving target based on the 2D coordinate according to equation (5). It should be noted that when the first value is equal to the fourth value, the processing device 120 may determine the 3D coordinate of the moving target based on the 2D coordinate according to equation (4) or equation (5).

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 700 and/or one or more operations of the process 700 described above may be omitted. For example, operation 710 may be divided into two steps. One step may be used for determining whether the first value is greater than the fourth value, and another step may be used for determining the transformation relationship based on the determination result.

Figure 8:
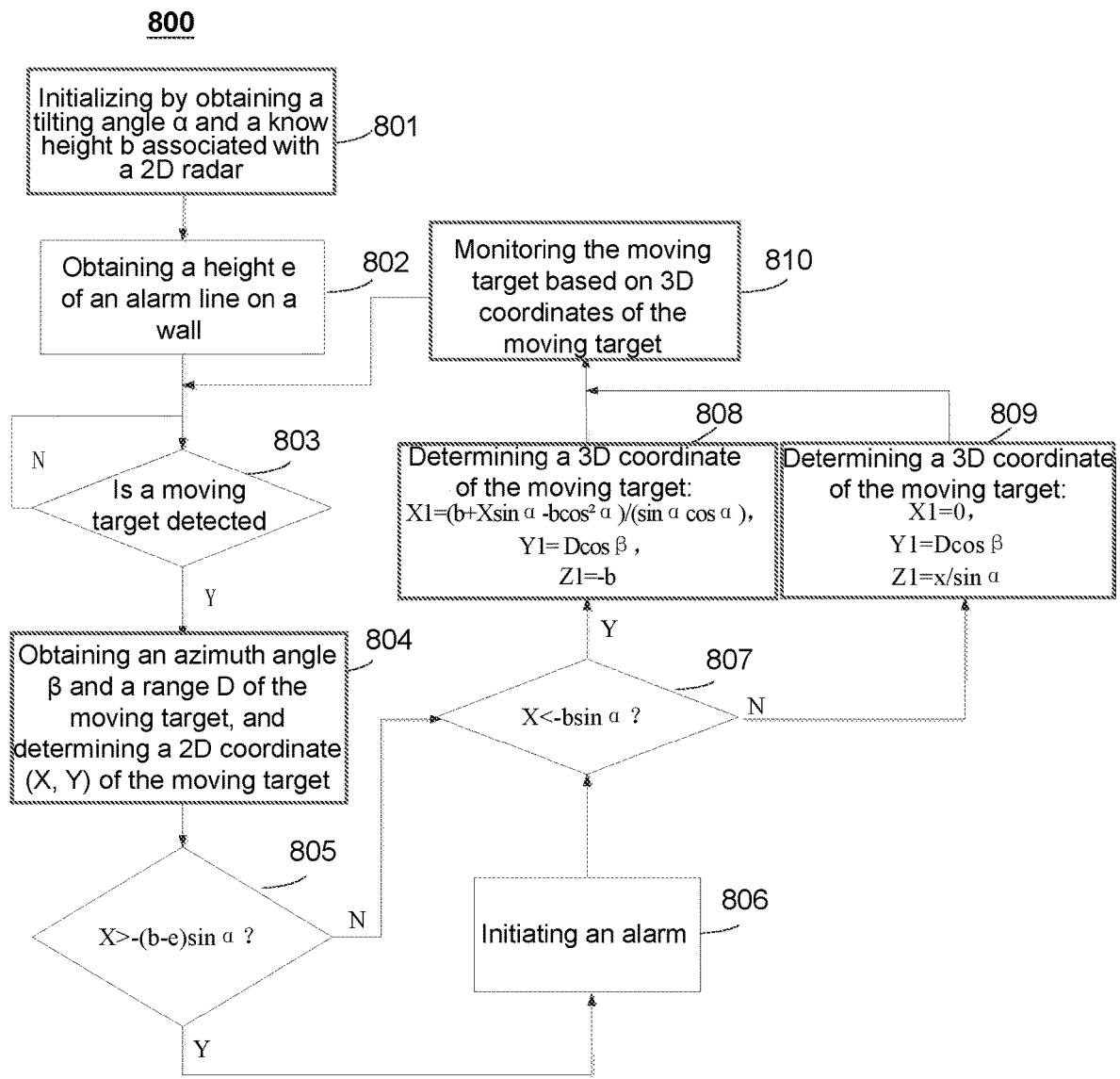
FIG. 8 is a flowchart of an exemplary process for processing radar detection data according to some embodiments of the present disclosure.

FIG. 8 is a flowchart of an exemplary process 800 for processing radar detection data according to some embodiments of the present disclosure. In some embodiments, one or more operations in the process 800 may be implemented in the radar system 100 illustrated in FIG. 1. For example, one or more operations in the process 800 may be stored in a storage device (e.g., the storage device 130, the ROM 230, the RAM 240, and/or the storage 390) as a form of instructions, and invoked and/or executed by a processing device 120 (e.g., the processor 220, the CPU 340, and/or one or more modules illustrated FIGS. 4A and 4B) of the radar system 100. The operations of the illustrated process presented below are intended to be illustrative. In some embodiments, the process 800 may be accomplished with one or more additional operations not described and/or without one or more of the operations discussed. Additionally, the order in which the operations of the process 800 as illustrated in FIG. 8 and described below is not intended to be limiting.

In 801, the processing device 120 (e.g., the acquisition module 410) may initialize a 2D radar (e.g., the 2D detection device 110) by obtaining a tilting angle and a known height associated with the 2D radar. The tilting angle and the known height may be the same as or similar to that described in FIG. 5, and may not be repeated here. For example, the 2D radar may be mounted at a perimeter (e.g., a wall) with the known height and the tilting angle. The processing device 120 may also determine a 2D coordinate system associated with the 2D radar (e.g., the first coordinate system as described in FIG. 5) and a world coordinate system (e.g., the second coordinate system as described in FIG. 5).

In 802, the processing device 120 (e.g., the acquisition module 410) may obtain a height of an alarm line (e.g., the height e as described in FIG. 5) on the wall.

In 803, the processing device 120 (e.g., the determination module 420) may determine whether a moving target is detected. The processing device 120 may determine whether a moving target is detected based on a technique described elsewhere in the present disclosure (e.g., FIGS. 1, 5 and the descriptions thereof). In response to a determination that a moving target is detected, the process 800 may proceed to operation 804. In response to a determination that no moving target is detected, the processing device 120 may continue to perform operation 803.

In 804, the processing device 120 (e.g., the acquisition module 410) may obtain an azimuth angle $\beta$ of the moving target and a range D of the moving target. The processing device 120 (e.g., the determination module 420) may determine a 2D coordinate of the moving target in the radar coordinate system (also referred to as a 2D coordinate (X, Y)), wherein $X=-D \sin \beta$, and $Y=D \cos \beta$.

In 805, the processing device 120 (e.g., the determination module 420) may determine whether X is greater than $-(b-e)\sin \alpha$ (i.e., $x>-(b-e)\sin \alpha$). In response to a determination that X is greater than $-(b-e)\sin \alpha$, the process may proceed to operation 806. In response to a determination that X is less than $-(b-e)\sin \alpha$, the process 800 may proceed to operation 807. It should be noted that if X is equal to $-(b-e)\sin\alpha$, the process may proceed to operation 806 (not shown in FIG. 8) to operation 807 (as shown in FIG. 8).

In 806, the processing device 120 (e.g., the determination module 420) may determine an alarm and initiate the alarm. Merely by way of example, the initiated alarm may be the level-II alarm as described in FIG. 5. In some embodiments, before, or after, or during initiating the alarm, the processing device may perform operation 807.

In 807, the processing device 120 (e.g., the determination module 420) may determine whether X is less than $-b \sin \alpha$ (i.e., $X<-b \sin \alpha$. In response to a determination that X is less than $-b \sin \alpha$, the process may proceed to operation 808. In response to a determination that X is greater than $-b \sin \alpha$, the process 800 may proceed to operation 809. It should be noted that, if X is equal to $-b \sin \alpha$, the process 800 may proceed to operation 808 (not shown in FIG. 8) or proceed to operation 809 (as shown in FIG. 8).

In 808, the processing device 120 (e.g., the determination module 420) may determine a 3D coordinate of the moving target in the world coordinate system (also referred to as a 3D coordinate (X1, Y1, Z1)), wherein $X1=(b+X \sin \alpha - \cos 2\alpha)/(\sin \alpha \cos \alpha)$, $Y1=D \cos \beta$, $Z1=-b$.

In 809, the processing device 120 (e.g., the determination module 420) may determine a 3D coordinate of the moving target in the world coordinate system (also referred to as a 3D coordinate (X1, Y1, Z1)), wherein $X1=0$, $Y1=D \cos \beta$, $Z1=X/\sin \alpha$.

In 810, the processing device 120 (e.g., the determination module 420) may monitor the moving target based on 3D coordinates according to continuously performing operations 803 to 809 to determine the 3D coordinates of the moving target. The processing device 120 may monitor the moving target as described elsewhere in the present disclosure (e.g., FIG. 5 and the descriptions thereof).

It should be noted that the above description regarding the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 800 and/or one or more operations of the process 800 described above may be omitted. For example, operations 805 and 806 may be omitted and process 800 may proceed to operation 807 from operation 804.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for determining a three-dimensional (3D) coordinate of a moving target, the system comprising:
   at least one non-transitory storage medium including a set of instructions;
   at least one processor to communicate with the at least one non-transitory storage medium; and
   a two-dimensional (2D) detection device, wherein the 2D detection device is mounted on a perimeter that is substantially perpendicular to a horizontal plane and the 2D detection device including a shell and at least two detection assemblies, wherein the shell is used to accommodate the at least two detection assemblies; and the at least two detection assemblies are mounted at a known height above the horizontal plane with a tilting angle, wherein the at least two detection assemblies are mounted at a known height above the horizontal plane with a tilting angle includes:
     the at least two detection assemblies are mounted parallel to the shell of the 2D detection device and the shell of the 2D detection device is mounted with the tilting angle to the horizontal plane; or
     the at least two detection assemblies are mounted with the tilting angle to the shell of the 2D detection device and the shell of the 2D detection device is mounted parallel to the horizontal plane;
   and the 2D detection device is configured to:
     generate 2D detection data of the moving target;
   when executing the set of instructions, the at least one processor is directed to:
     obtain the two-dimensional (2D) detection data from the 2D detection device;
     determine a 2D coordinate of the moving target in a first coordinate system based on the 2D detection data, wherein the first coordinate system is a 2D coordinate system including the first axis and a second axis that is perpendicular to the first axis, and the 2D coordinate of the moving target includes a first value of the first axis and a second value of the second axis; and
     determine the 3D coordinate of the moving target in a second coordinate system based on the 2D coordinate, the tilting angle, and the known height.

2. The system of claim 1, the at least one processor is further directed to:
   determine whether the moving target is above a preset height above the horizontal plane based on the 3D coordinate.

3. The system of claim 2, wherein to determine whether the moving target is above a preset height above the horizontal plane based on the 3D coordinate system, the at least one processor is configured to:
   determine a height of the moving target based on the 3D coordinate; and
   determine, based on the height of the moving target and the preset height, whether the moving target is above the preset height.

4. The system of claim 2, wherein, in response to a determination that the moving target is above the preset height, the at least one processor is further configured to:
   initiate an alarm for alerting a user, or
   initiate an alarm for alerting the moving target.

5. The system of claim 1, wherein the 2D detection device is mounted on a perimeter that is substantially perpendicular to the horizontal plane, and the at least one processor is further configured to:

determine whether the moving target is above a preset height above the horizontal plane based on the first value.

6. The system of claim 5, wherein to determine whether the moving target is above a preset height above the horizontal plane based on the first value, the at least one processor is configured to:
   determine, based on the known height and the tilting angle, a third value of the first axis corresponding to the preset height by projecting a line of the perimeter with the preset height to the first axis; and
   determine whether the moving target is above the preset height based on the first value and the third value.

7. The system of claim 1, wherein the 2D detection device is mounted on a perimeter that is substantially perpendicular to the horizontal plane, and to determine the 3D coordinate of the moving target in a second coordinate system based on the 2D coordinate, the tilting angle, and the known height, the at least one processor is configured to:
   determine a transformation relationship between the first coordinate system and the second coordinate system based on the tilting angle and the known height; and
   determine the 3D coordinate of the moving target in the second coordinate system based on the transformation relationship and the 2D coordinate.

8. The system of claim 7, wherein the second coordinate system includes a third axis, a fourth axis, and a fifth axis, the third axis being horizontal and perpendicular to the fourth axis, the fourth axis coinciding with the second axis, and the fifth axis being vertical to the horizontal plane, and to determine a transformation relationship between the first coordinate system and the second coordinate system based on the tilting angle and the known height, the at least one processor is configured to:
   determine, based on the tilting angle and the known height, a fourth value of the first axis corresponding to the perimeter by projecting a line formed by intersecting the perimeter and the horizontal plane to the first axis; and
   determine the transformation relationship based on the fourth value and the first value.

9. The system of claim 1, wherein the 2D detection data of the moving target includes a distance of the moving target and an azimuth angle of the moving target.

10. The system of claim 1, wherein the 2D detection device is a 2D radar device.

11. A method for determining a three-dimensional (3D) coordinate of a moving target, the method being implemented on a computing device having at least one processor and at least one non-transitory storage device, the method comprising:
   generate a two-dimensional (2D) detection data of the moving target by a two-dimensional (2D) detection device, wherein the 2D detection device is mounted on a perimeter that is substantially perpendicular to a horizontal plane, the 2D detection device including a shell and at least two detection assemblies, wherein the shell is configured to accommodate the at least two detection assemblies; and the at least two detection assemblies are mounted at a known height above the horizontal plane with a tilting angle, wherein the at least two detection assemblies are mounted at a known height above the horizontal plane with a tilting angle includes:
      the at least two detection assemblies are mounted parallel to the shell of the 2D detection device and the shell of the 2D detection device is mounted with the tilting angle to the horizontal plane; or
      the at least two detection assemblies are mounted with the tilting angle to the shell of the 2D detection device and the shell of the 2D detection device is mounted parallel to the horizontal plane;
   obtain the two-dimensional (2D) detection data from the 2D detection device;
   determining a 2D coordinate of the moving target in a first coordinate system based on the 2D detection data, wherein the first coordinate system is a 2D coordinate system including the first axis and a second axis that is perpendicular to the first axis, and the 2D coordinate of the moving target includes a first value of the first axis and a second value of the second axis; and
   determining the 3D coordinate of the moving target in a second coordinate system based on the 2D coordinate, the tilting angle, and the known height.

12. The method of claim 11, the method further comprises:
   determining whether the moving target is above a preset height above the horizontal plane based on the 3D coordinate.

13. The method of claim 12, wherein the determining whether the moving target is above a preset height above the horizontal plane based on the 3D coordinate system includes:
   determining a height of the moving target based on the 3D coordinate; and
   determining, based on the height of the moving target and the preset height, whether the moving target is above the preset height.

14. The method of claim 12, wherein, in response to a determination that the moving target is above the preset height, the method further includes:
   initiating an alarm for alerting a user, or
   initiating an alarm for alerting the moving target.

15. The method of claim 11, wherein the 2D detection device is mounted on a perimeter that is substantially perpendicular to the horizontal plane, and the method further comprises:
   determining whether the moving target is above a preset height above the horizontal plane based on the first value.

16. The method of claim 15, wherein the determining whether the moving target is above a preset height above the horizontal plane based on the first value includes:
   determining, based on the known height and the tilting angle, a third value of the first axis corresponding to the preset height by projecting a line of the perimeter with the preset height to the first axis; and
   determining whether the moving target is above the preset height based on the first value and the third value.

17. The method of claim 11, wherein the 2D detection device is mounted on a perimeter that is substantially perpendicular to the horizontal plane, and the determining a 3D coordinate of the moving target in a second coordinate system based on the 2D coordinate, the tilting angle, and the known height includes:
   determining a transformation relationship between the first coordinate system and the second coordinate system based on the tilting angle and the known height; and
   determining the 3D coordinate of the moving target in the second coordinate system based on the transformation relationship and the 2D coordinate.

18. The method of claim 17, wherein the second coordinate system includes a third axis, a fourth axis, and a fifth axis, the third axis being horizontal and perpendicular to the fourth axis, the fourth axis coinciding with the second axis, and the fifth axis being vertical to the horizontal plane, and the determining a transformation relationship between the first coordinate system and the second coordinate system based on the tilting angle and the known height includes:
determining, based on the tilting angle and the known height, a fourth value of the first axis corresponding to the perimeter by projecting a line formed by intersecting the perimeter and the horizontal plane to the first axis; and
determining the transformation relationship based on the fourth value and the first value.

19. The method of claim 11, wherein the 2D detection data of the moving target includes a distance of the moving target and an azimuth angle of the moving target.

20. A non-transitory computer readable medium storing instructions, the instructions, when executed by at least one processor, causing the at least one processor to implement a method comprising:
generating two-dimensional (2D) detection data of the moving target by a two-dimensional (2D) detection device, wherein the 2D detection device is mounted on a perimeter that is substantially perpendicular to a horizontal plane and the 2D detection device including a shell and at least two detection assemblies, wherein the shell is used to accommodate the at least two detection assemblies; and the at least two detection assemblies are mounted at a known height above the horizontal plane with a tilting angle, wherein the at least two detection assemblies are mounted at a known height above the horizontal plane with a tilting angle includes:
the at least two detection assemblies are mounted parallel to the shell of the 2D detection device and the shell of the 2D detection device is mounted with the tilting angle to the horizontal plane; or
the at least two detection assemblies are mounted with the tilting angle to the shell of the 2D detection device and the shell of the 2D detection device is mounted parallel to the horizontal plane;
obtaining two-dimensional (2D) detection data of the moving target from the two-dimensional (2D) detection device;
determining a 2D coordinate of the moving target in a first coordinate system based on the 2D detection data, wherein the first coordinate system is a 2D coordinate system including the first axis and a second axis that is perpendicular to the first axis, and the 2D coordinate of the moving target includes a first value of the first axis and a second value of the second axis; and
determining the 3D coordinate of the moving target in a second coordinate system based on the 2D coordinate, the tilting angle, and the known height.

* * * * *